United States Patent
Rhea

(10) Patent No.: US 11,033,015 B2
(45) Date of Patent: Jun. 15, 2021

(54) WRIST WORN STORAGE ASSEMBLY

(71) Applicant: Cody Rhea, Manassas, VA (US)

(72) Inventor: Cody Rhea, Manassas, VA (US)

( * ) Notice: Subject to any disclaimer, the term of this patent is extended or adjusted under 35 U.S.C. 154(b) by 340 days.

(21) Appl. No.: 16/057,088

(22) Filed: Aug. 7, 2018

(65) Prior Publication Data
US 2020/0045949 A1 Feb. 13, 2020

(51) Int. Cl.
*A01K 97/06* (2006.01)
*A45F 3/00* (2006.01)

(52) U.S. Cl.
CPC ............... *A01K 97/06* (2013.01); *A45F 3/00* (2013.01); *A45F 2003/003* (2013.01); *A45F 2003/008* (2013.01)

(58) Field of Classification Search
CPC ............... A01K 97/06; A45F 2003/003; A45F 2003/008; A45F 2005/008; A45F 2200/0508; A45F 2200/0516
See application file for complete search history.

(56) References Cited

U.S. PATENT DOCUMENTS

| | | | |
|---|---|---|---|
| 1,484,399 A | 2/1924 | Kroha | |
| 5,212,900 A | 5/1993 | Perry | |
| 5,333,767 A | 8/1994 | Anderson | |
| D353,262 S | 12/1994 | Cantavespre | |
| 5,454,185 A | 10/1995 | Love | |
| D382,995 S | 9/1997 | Hale | |
| 6,330,961 B1 | 12/2001 | Borja | |
| 7,048,162 B2 | 5/2006 | Frye | |
| 8,955,745 B2 * | 2/2015 | Tovar | A45F 5/00 235/380 |
| 9,737,130 B1 * | 8/2017 | Frontino | B44D 3/123 |
| 2007/0083979 A1 * | 4/2007 | Daniels | A41D 19/002 2/160 |
| 2012/0317696 A1 * | 12/2012 | Chapuis | A41D 19/0024 2/160 |
| 2013/0026248 A1 * | 1/2013 | Paulsen | A45F 3/16 239/1 |
| 2016/0106172 A1 * | 4/2016 | Kelson | A41G 5/02 132/201 |

* cited by examiner

*Primary Examiner* — Richard G Davis

(57) ABSTRACT

A wrist worn storage assembly for storing fishing tackle on a wrist includes a tube that is worn around a wrist. The tube has a thumb portal and a hand portal. The thumb portal has a thumb extended therethrough and the hand portal has a hand extended therethrough. A panel is coupled to the tube and the panel is folded onto itself to define a pouch for storing fishing tackle. In this way the fishing tackle is stored on the wrist during fishing for easy access to the fishing tackle.

7 Claims, 6 Drawing Sheets

WRIST WORN STORAGE ASSEMBLY

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to storage devices and more particularly pertains to a new storage device for storing fishing tackle on a wrist.

BRIEF SUMMARY OF THE INVENTION

An embodiment of the disclosure meets the needs presented above by generally comprising a tube that is worn around a wrist. The tube has a thumb portal and a hand portal. The thumb portal has a thumb extended therethrough and the hand portal has a hand extended therethrough. A panel is coupled to the tube and the panel is folded onto itself to define a pouch for storing fishing tackle. In this way the fishing tackle is stored on the wrist during fishing for easy access to the fishing tackle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
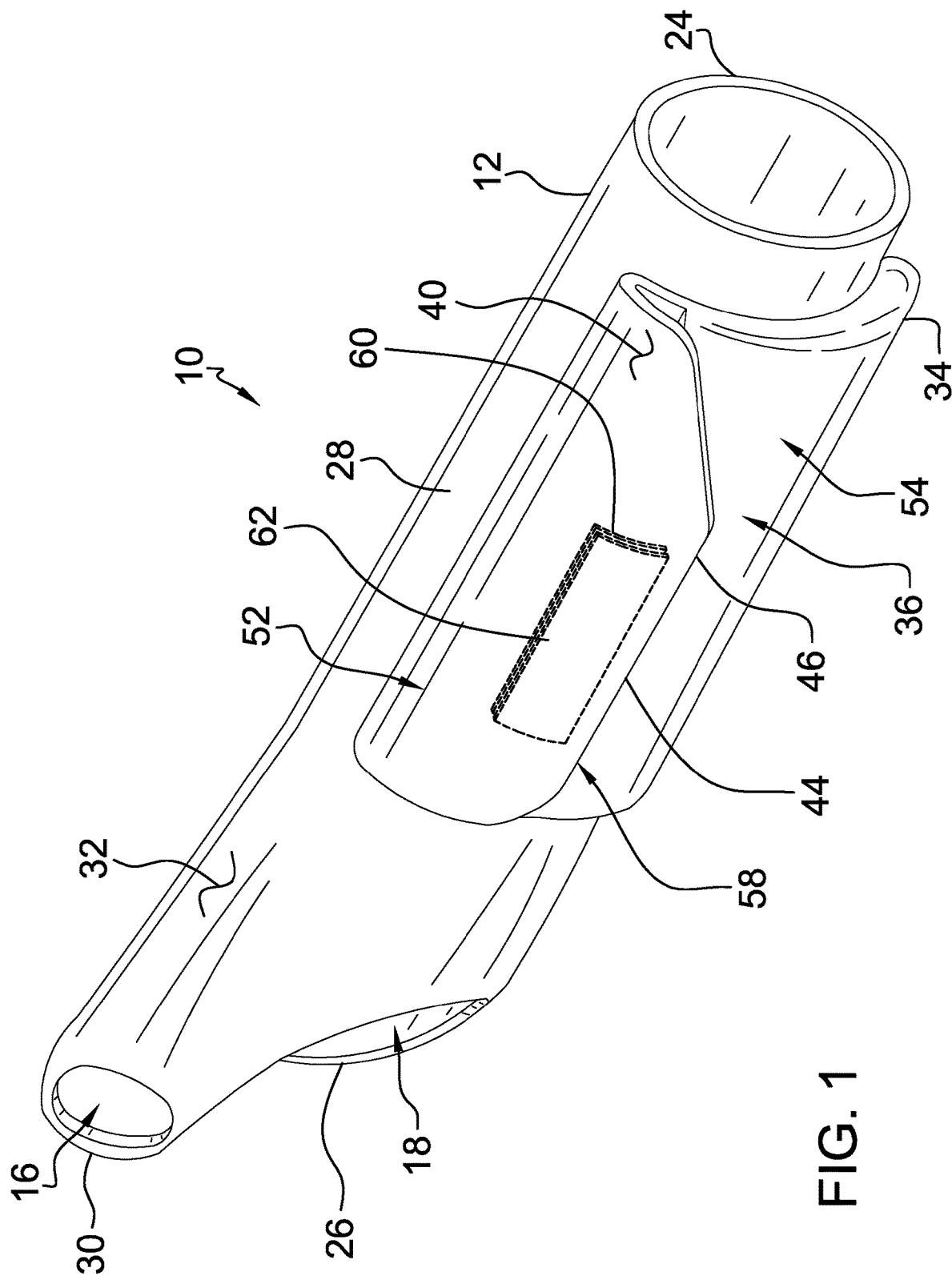
FIG. 1 is a perspective view of a wrist worn storage assembly according to an embodiment of the disclosure.
Figure 2:
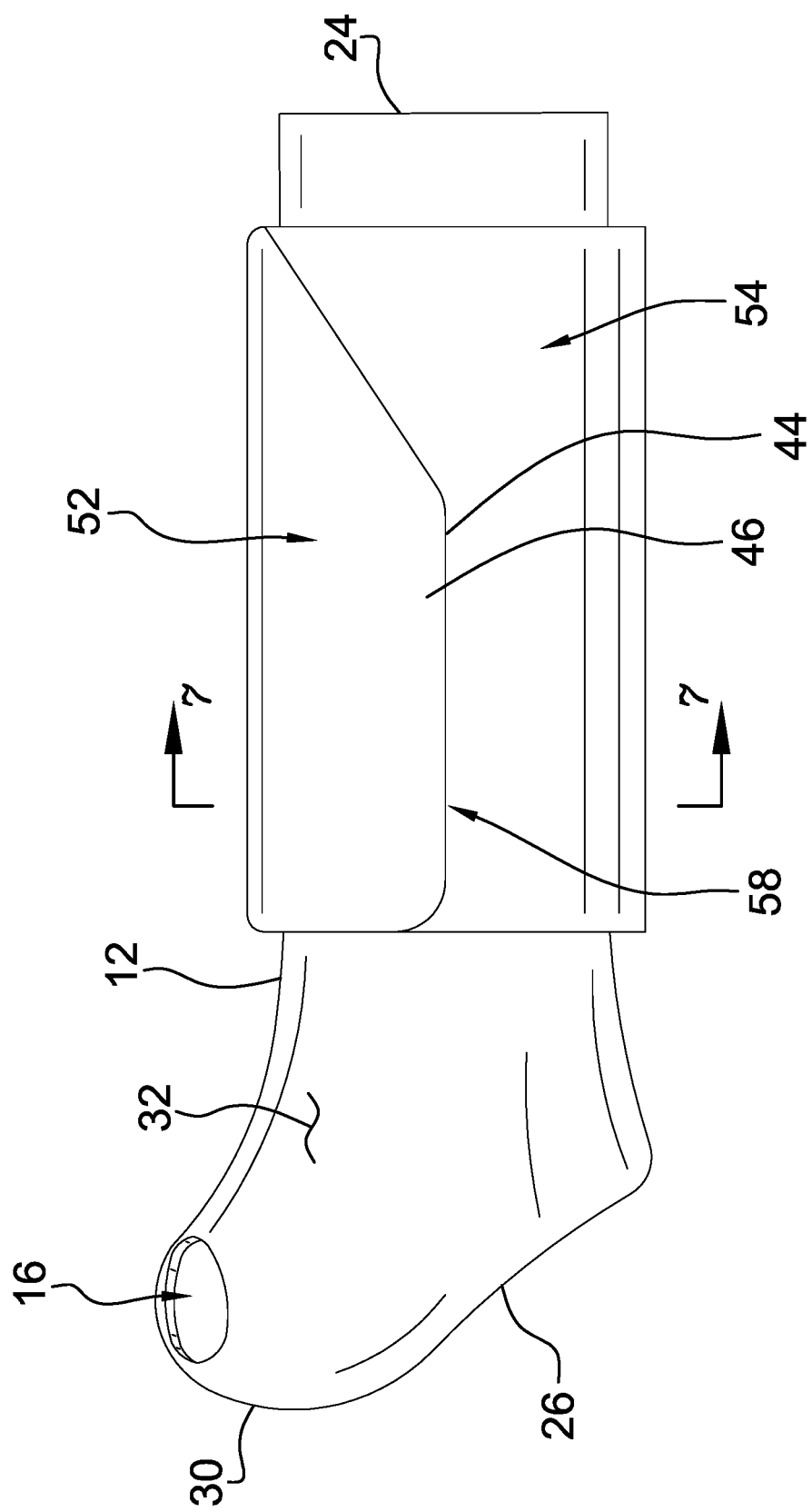
FIG. 2 is a left side view of an embodiment of the disclosure.
Figure 3:
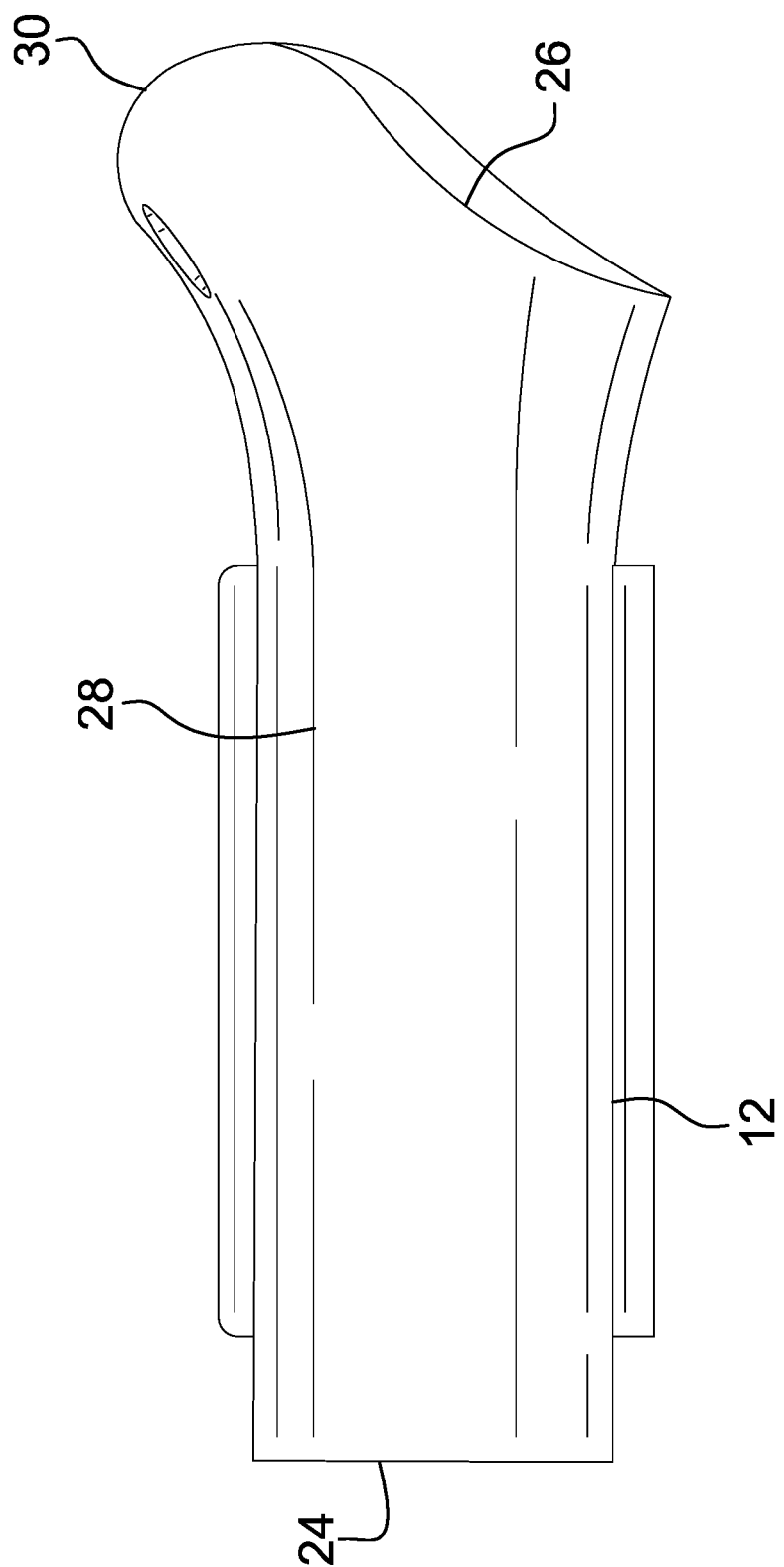
FIG. 3 is a right side view of an embodiment of the disclosure.
Figure 5:
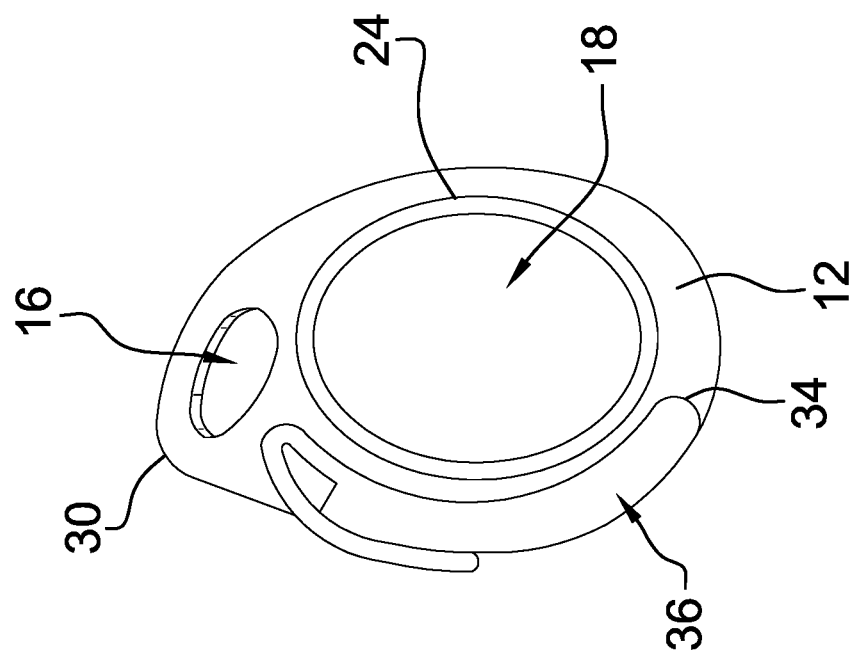
FIG. 5 is a back view of an embodiment of the disclosure.
Figure 4:
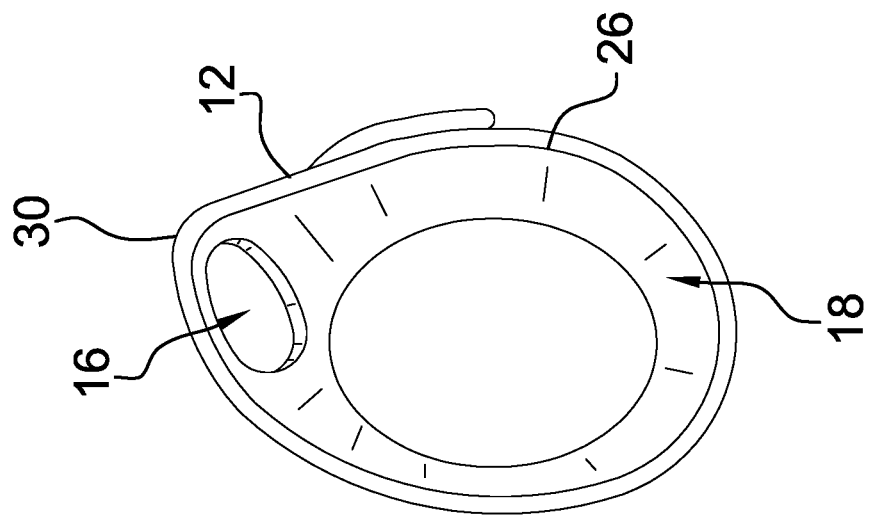
FIG. 4 is a front view of an embodiment of the disclosure.
Figure 6:
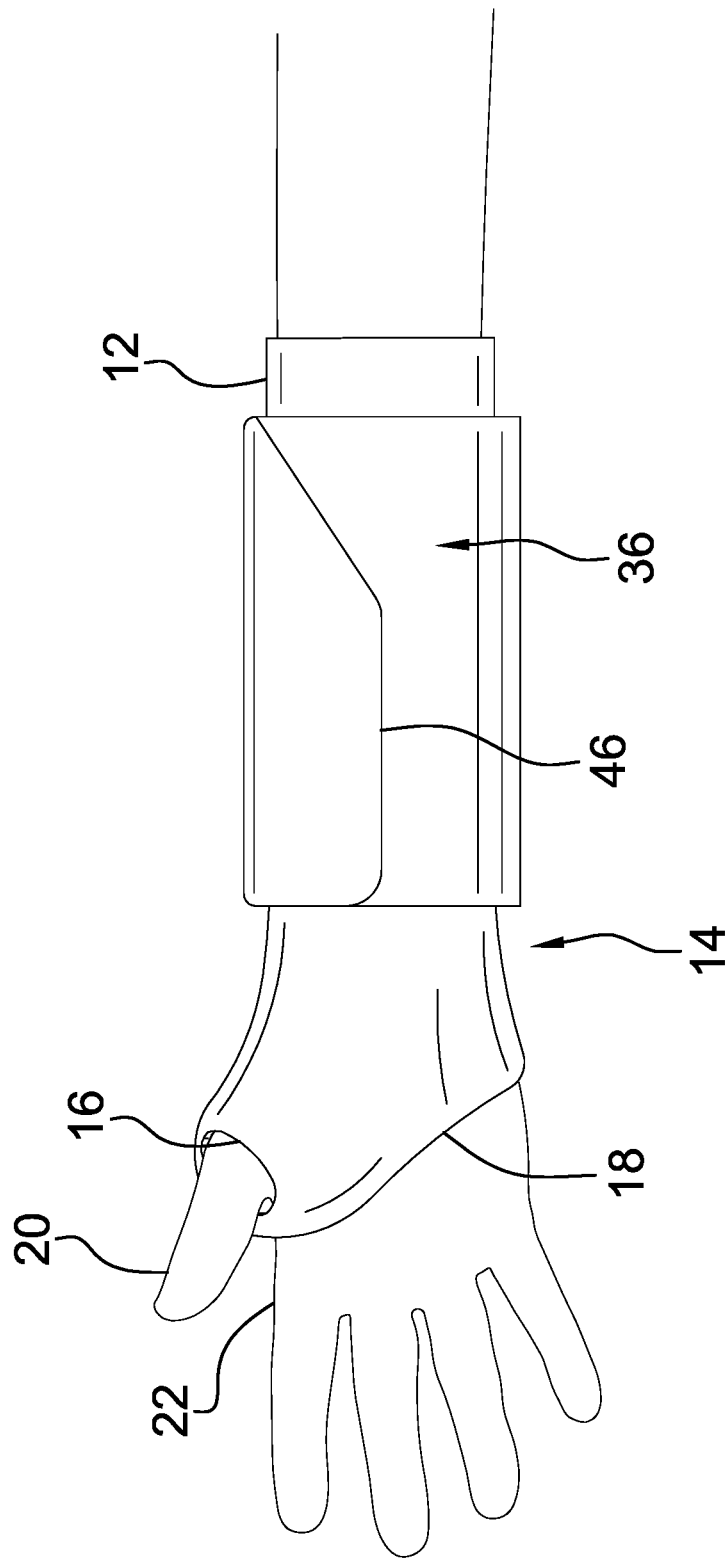
FIG. 6 is a perspective in-use view of an embodiment of the disclosure.
Figure 7:
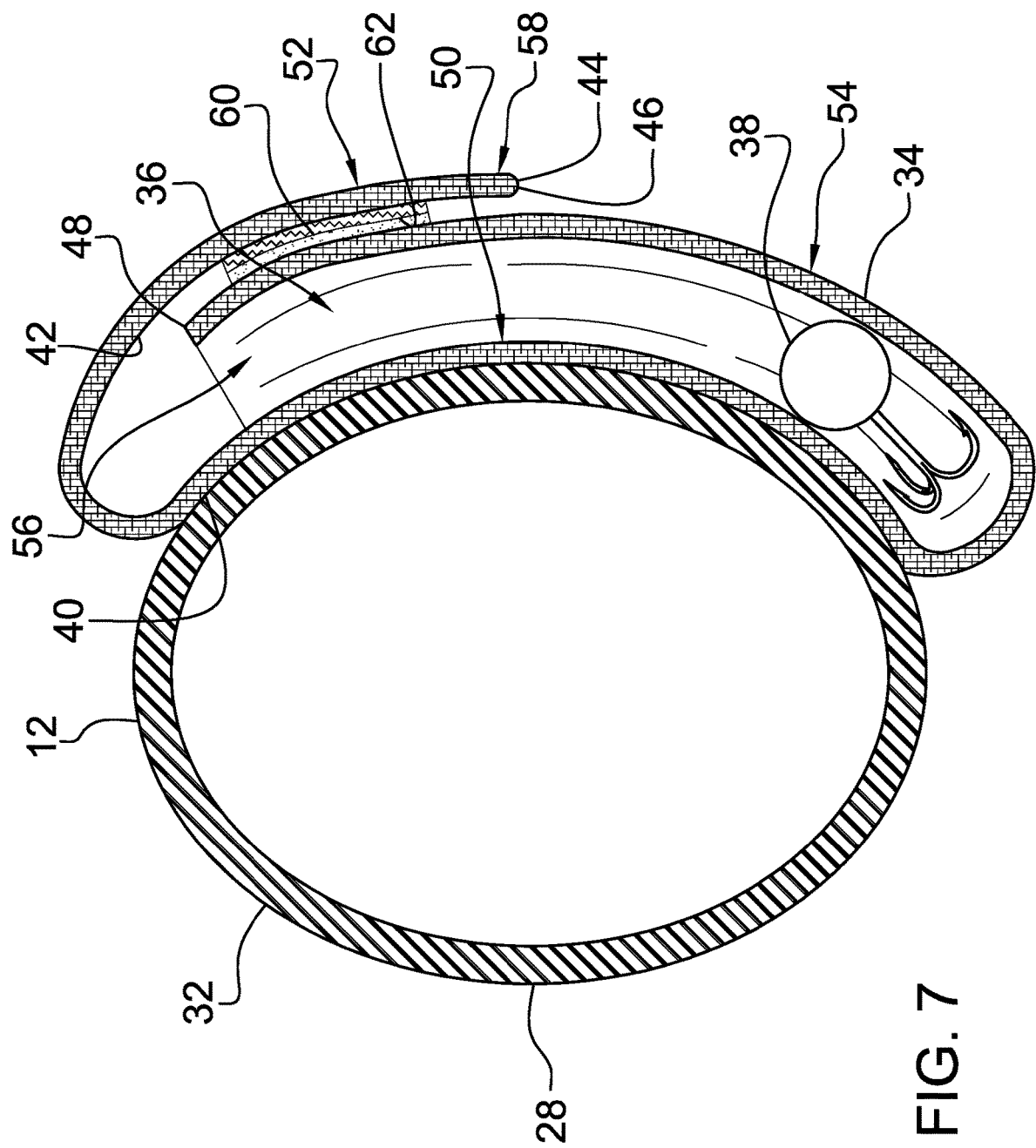
FIG. 7 is a cross sectional view taken along line 7-7 of FIG. 2 of an embodiment of the disclosure.

With reference now to the drawings, and in particular to FIGS. 1 through 7 thereof, a new storage device embodying the principles and concepts of an embodiment of the disclosure and generally designated by the reference numeral 10 will be described.

As best illustrated in FIGS. 1 through 7, the wrist worn storage assembly 10 generally comprises a tube 12 that is worn around a wrist 14 of a non-dominant hand during fishing. The tube 12 has a thumb portal 16 and a hand portal 18; the thumb portal 16 has a thumb 20 extended therethrough and the hand portal 18 has a hand 22 extended therethrough. The tube 12 has a first end 24, a second end 26 and an outer wall 28 extending therethrough, and the second end 26 defines the hand portal 18. The outer wall 28 flares outwardly adjacent to the second end 26 to define a horn portion 30 of the outer wall 28. The tube 12 has the greatest length along a line extending through the first end 24 and the horn portion 30. The thumb portal 16 extends the horn portion 30 of the outer wall 28 and the outer wall 28 has an outside surface 32. The tube 12 may be comprised of a resiliently stretchable material, such as spandex or the like, thereby supporting the wrist 14.

A panel 34 is coupled to the tube 12 and the panel 34 is folded onto itself to define a pouch 36 for storing fishing tackle 38. In this way the fishing tackle 38 is positioned on the wrist 14 during fishing for easy access to the fishing tackle 38. The panel 34 may be comprised of a resiliently stretchable material such as spandex or the like. Moreover, the panel 34 may be comprised of a pierce resistant material thereby inhibiting hooks on the fishing tackle 38 from engaging the pouch 36.

The panel 34 has a first surface 40, a second surface 42 and a peripheral edge 44 extending therebetween, and the peripheral edge 44 has a first side 46 and a second side 48. A portion of the first surface 40 is coupled to the outside surface 32 of the tube 12 thereby defining a coupled portion 50 being coupled to said tube 12, a first free portion 52 and a second free portion 54 of the panel 34. The first end 24 has the first free portion 52 associated therewith and the second end 26 has the second free portion 54 associated therewith. The second free portion 54 is folded over the coupled portion 50 having the second side 48 being spaced from the coupled portion 50 to define an opening 56 in the pouch 36. The first free portion 52 is foldable over the second free portion 54, thereby forming a flap 58 to cover the opening 56 in the pouch 36. The first end 24 may have a an angled edge on one side of the flap 58.

A first mating member 60 is coupled to the first surface 40 of the second free portion 54 of the panel 34. The first mating member 60 is spaced from the second side 48 of the peripheral edge 44 of the panel 34. A second mating member 62 is coupled to the second surface 42 of the first free portion 52 of the panel 34. The second mating member 62 is spaced from the first side 46 of the peripheral edge 44 of the panel 34. Additionally, the second mating member 62 releasably engages the first mating member 60 to close the pouch 36. Each of the first 60 and second 62 mating members may comprise a hook and loop fastener or other type of releasable fastener that is unaffected by exposure to water.

In use, the tube 12 is worn on the wrist 14 of the non-dominant hand during fishing. Selected lures, baits and other articles of fishing tackle 38 are positioned in the pouch 36. Thus, each of the selected lures, baits and other articles of fishing tackle 38 are immediately available while a fishing rod is being used. In this way the fishing tackle 38 on the fishing rod can be quickly changed, thereby reducing time spent not fishing. Additionally, the tube 12 supports the wrist 14 thereby reducing fatigue while using the fishing rod.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wrist worn storage assembly being configured to store fishing tackle during fishing, said assembly comprising:
    a tube being configured to be worn around a wrist, said tube having a thumb portal and a hand portal, said thumb portal being configured for having a thumb extended therethrough, said hand portal being configured for having a hand extended therethrough, said tube having a length wherein a portion of said tube is configured to extend from the wrist and along a forearm; and
    a panel being coupled to said tube on said portion of said tube configured to extend along the forearm, said panel being folded onto itself to define a pouch for storing fishing tackle wherein said tube is configured to position the fishing tackle on the wrist during fishing for easy access to the fishing tackle.

2. The assembly according to claim 1, wherein said tube has a first end, a second end and an outer wall extending therebetween, said second end defining said hand portal, said outer wall flaring outwardly adjacent to said second end to define a horn portion of said outer wall, said horn portion of said outer wall having said thumb portal extending therethrough, said outer wall having an outside surface.

3. The assembly according to claim 2, wherein said panel has a first surface, a second surface and a peripheral edge extending therebetween, said peripheral edge having a first side and a second side, a portion of said first surface being coupled to said outside surface of said tube thereby defining a coupled portion, a first free portion and a second free portion of said panel, said first end having said first free portion being associated therewith, said second end having said second free portion being associated therewith.

4. The assembly according to claim 3, wherein:
    said second free portion is folded over said coupled portion having said second side being spaced from said coupled portion to define an opening in said pouch; and
    said first free portion being foldable over said second free portion to cover said opening in said pouch.

5. The assembly according to claim 3, further comprising a first mating member being coupled to said first surface of said second free portion of said panel, said first mating member being spaced from said second side of said peripheral edge of said panel.

6. The assembly according to claim 5, further comprising a second mating member being coupled to said second surface of said first free portion of said panel, said second mating member being spaced from said first side of said peripheral edge of said panel, said second mating member releasably engaging said first mating member to close said pouch.

7. A wrist worn storage assembly being configured to store fishing tackle during fishing, said assembly comprising:
    a tube being configured to be worn around a wrist, said tube having a thumb portal and a hand portal, said thumb portal being configured for having a thumb extended therethrough, said hand portal being configured for having a hand extended therethrough, said tube having a first end, a second end and an outer wall extending therethrough, said second end defining said hand portal, said outer wall flaring outwardly adjacent to said second end to define a horn portion of said outer wall, said horn portion of said outer wall having said thumb portal extending therethrough, said outer wall having an outside surface, said tube having a length wherein a portion of said tube is configured to extend from the wrist and along a forearm;
    a panel being coupled to said tube on said portion of said tube configured to extend along the forearm, said panel being folded onto itself to define a pouch for storing fishing tackle wherein said tube is configured to position the fishing tackle on the wrist during fishing for easy access to the fishing tackle, said panel having a first surface, a second surface and a peripheral edge extending therebetween, said peripheral edge having a first side and a second side, a portion of said first surface being coupled to said outside surface of said tube thereby defining a coupled portion, a first free portion and a second free portion of said panel, said first end having said first free portion being associated therewith, said second end having said second free portion being associated therewith, said second free portion being folded over said coupled portion having said second side being spaced from said coupled portion to define an opening in said pouch, said first free portion being foldable over said second free portion to cover said opening in said pouch;

a first mating member being coupled to said first surface of said second free portion of said panel, said first mating member being spaced from said second side of said peripheral edge of said panel; and a second mating member being coupled to said second surface of said first free portion of said panel, said second mating member being spaced from said first side of said peripheral edge of said panel, said second mating member releasably engaging said first mating member to close said pouch.

* * * * *